United States Patent [19]

Cimperman

[11] Patent Number: 4,876,954
[45] Date of Patent: Oct. 31, 1989

[54] METHOD AND APPARATUS FOR PITTING AND SLICING OLIVES

[75] Inventor: Fred J. Cimperman, Castro Valley, Calif.

[73] Assignee: Ashlock Company, San Leandro, Calif.

[21] Appl. No.: 143,822

[22] Filed: Jan. 13, 1988

[51] Int. Cl.⁴ .............................................. A23N 4/12
[52] U.S. Cl. ...................................... 99/545; 99/543; 99/557; 99/559; 99/565; 83/411.6
[58] Field of Search ................. 99/541, 542, 543, 544, 99/545, 546, 547, 548, 549, 552, 555, 556, 559-561, 564, 557, 494; 83/350-352, 356, 356.1, 356.2, 356.3, 355, 357, 411 R

[56] References Cited

U.S. PATENT DOCUMENTS

| | | | |
|---|---|---|---|
| 1,204,413 | 11/1916 | Coons | 99/543 |
| 1,441,490 | 1/1923 | Duncan | 99/543 |
| 2,097,170 | 10/1937 | Wilson | 99/543 |
| 2,205,397 | 6/1940 | Drake . | |
| 2,246,843 | 6/1941 | Drake | 99/544 |
| 2,360,103 | 10/1944 | Britten | 99/544 |
| 2,360,411 | 10/1944 | Frova | 99/544 |
| 2,681,088 | 6/1954 | Krupp | 99/544 |
| 2,681,089 | 6/1954 | Francisco | 99/544 |
| 2,821,223 | 1/1958 | Kagley et al. | 99/544 |
| 4,096,795 | 6/1978 | Del Ser Gonzalez . | |
| 4,290,350 | 9/1981 | Del Ser Gonzalez . | |
| 4,352,325 | 10/1982 | Pleus | 99/484 |
| 4,363,266 | 12/1982 | Tacky et al. | 99/545 |
| 4,388,858 | 6/1983 | Margaroli et al. . | |
| 4,644,859 | 2/1987 | Rubio et al. . | |

Primary Examiner—Harvey C. Hornsby
Assistant Examiner—Joseph S. Machuga
Attorney, Agent, or Firm—Alfred A. Equitz

[57] ABSTRACT

A method and apparatus for pitting olives and then slicing the pitted olives. In a preferred embodiment, each olive is carried in a cup positioned between a coring knife and a pitting knife in a manner so that the longitudinal axes of the cup and the knives coincide. As the cup and knives rotate around a drive shaft along parallel circular paths, a system of cams extends and retracts the knives relative to the cup, in order to pit the olive. After the pitting operation, the cup (containing a pitted olive) continues to rotate along its circular path past a set of slicing knives. The slicing knives are oriented substantially parallel to the plane of the cup's circular path, so that the slicing knives act as wedges to sever the olive cleanly into slices as the cup translates past the slicing knives. In the inventive method and apparatus, both the pitting and slicing operations are performed on each olive while the olive is held in a known orientation. The known orientation is not changed between the two operations, in order to enhance the uniformity of the resulting olive slices. The invention produces clean slices and reduces the amount of olive material destroyed during the slicing operation.

20 Claims, 4 Drawing Sheets

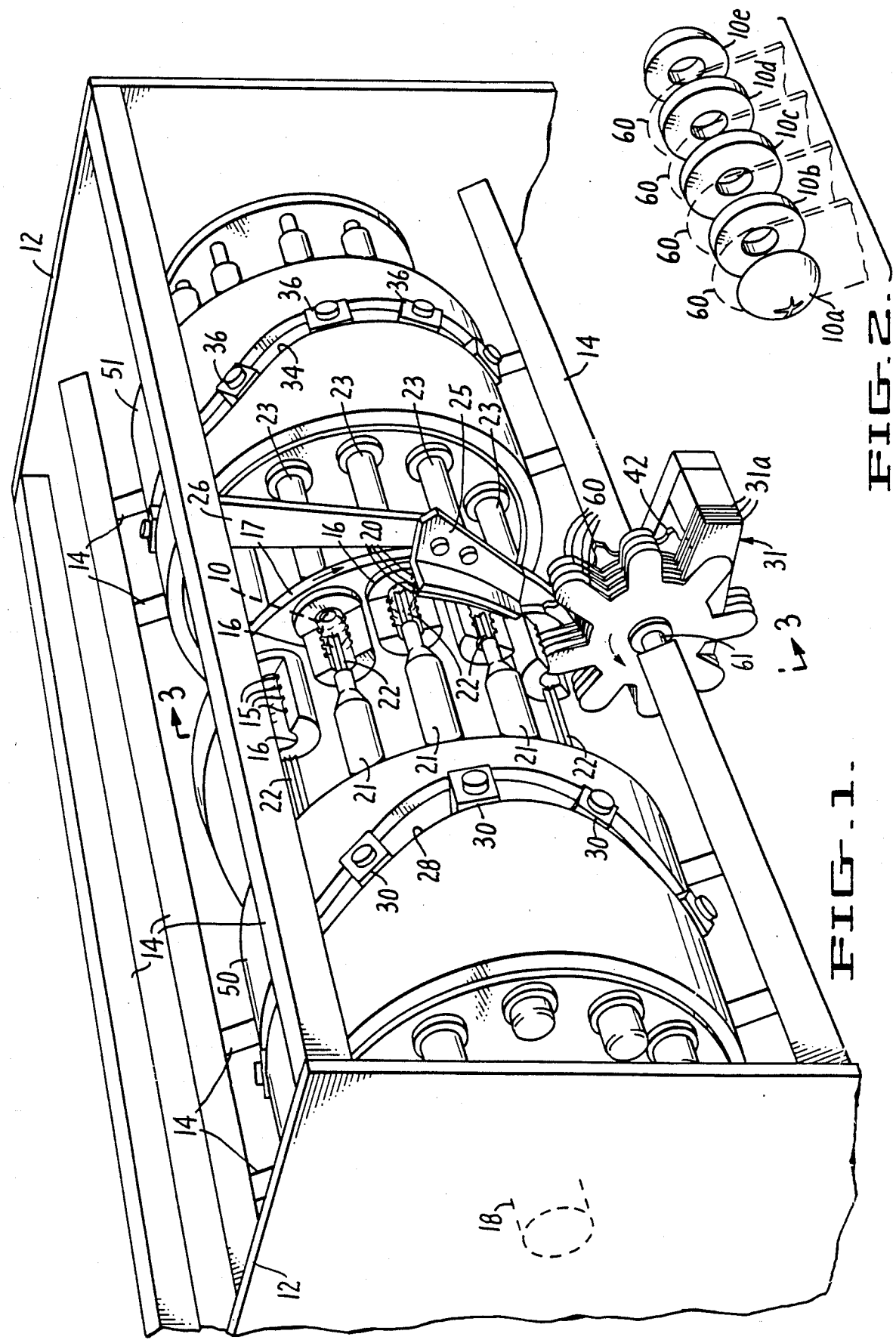

1

METHOD AND APPARATUS FOR PITTING AND SLICING OLIVES

FIELD OF THE INVENTION

The invention relates to methods and apparatus for pitting and slicing olives. More particularly, the invention is a method and apparatus capable of both removing the pits from olives and slicing the pitted olives.

BACKGROUND OF THE INVENTION

Conventional olive pitting machines employ cam-driven pairs of opposed, coaxial pitting knives and coring knives to remove the pits from olives. In such machines, each olive is held during the pitting operation in a position so that the olives's longitudinal axis coincides with the axis of the opposed knives.

To slice pitted olives using conventional machines, the pitted olives must be transferred from a pitting machine to a separate slicing machine. In the process of transferring the pitted olives, the orientations of the pitted olives are randomized. Thus, the pitted olives are either sliced with random orientation or must be reoriented prior to slicing.

In conventional olive slicing machines, each pitted olive slice is severed from the remaining portion of the olive by a sawing operation in which two or more closely spaced parallel blades saw through the olive. This sawing operation does not result in a clean slice, and instead destroys a portion of the olive between and adjacent the parallel blades.

It has not been known until the present invention how to both pit and slice olives in a single machine, with each olive held in the same orientation during both the pitting and slicing operation. Nor has it been known until the present invention how to perform the slicing portion of such combined pitting and slicing process in a manner resulting in clean olive slices with negligible loss.

SUMMARY OF THE INVENTION

The invention is a method and apparatus for pitting olives and then slicing the pitted olives. Each olive is carried in a cup as the cup is rotated along a circular path by a rotating drive shaft. In a preferred embodiment of the inventive apparatus, each cup is positioned between a coring knife and a pitting knife, so that the longitudinal axes of the cup and the knives coincide and the common longitudinal axis is substantially perpendicular to the plane of the cup's circular path. As the pitting and coring knives rotate along circular paths parallel to the cup's path, they are translated by cams along their common longitudinal axis into and out of engagement with an olive in the cup, in order to pit the olive. After the pitting operation, the cup (containing a pitted olive) continues to rotate along the circular path until it meets a set of slicing knives. The blades of the slicing knives are oriented substantially parallel to the plane of the cup's circular path, so that the slicing knives act as wedges to sever the olive cleanly into slices as the cup translates past the slicing knives.

Preferably, each cup contains grooves, each of which grooves receives one of the slicing knife edges after the edge has passed through a pitted olive held in the cup. In another preferred embodiment, the system of the invention includes one or more stationary holding blades, each aligned with one of the slicing knives, and positioned along the circular cup path. The cup rotates past the holding blades while carrying an olive which is impaled on the pitting knife. As the pitting knife withdraws from the olive, the olive engages the holding blades and the holding blades exert a force on the olive opposing the force exerted by the withdrawing pitting knife. This allows the pitting knife to separate from the olive. If the holding blades are aligned with the slicing knives, then the cuts produced by the holding blades will match those later produced by the slicing blades and will not detract from the appearance of the olive slices produced by the inventive apparatus.

In a preferred embodiment, stripper bars are provided for stripping from the slicing knives any olive slices clinging thereto after the slicing operation, and a star wheel drive is provided for rotating the slicing knives in a rotational direction opposite the direction in which the cups rotate.

The inventive method and apparatus perform both the pitting and slicing operations on each olive while the olive is held in a known orientation and without changing that known orientation between the two operations. This enhances the uniformity of the resulting olive slices. The relative orientation and motion of the olive and slicing knives results in clean slices and reduces the amount of olive material destroyed during the slicing operation.

BRIEF DESCRIPTION OF THE DRAWINGS

FIG. 1 is a perspective view of an apparatus embodying a preferred embodiment of the invention.

FIG. 2 is a perspective view of a pitted olive that has been sliced by the slicing knives of the apparatus shown in FIG. 1.

DETAILED DESCRIPTION OF THE PREFERRED EMBODIMENTS

Figure 3:
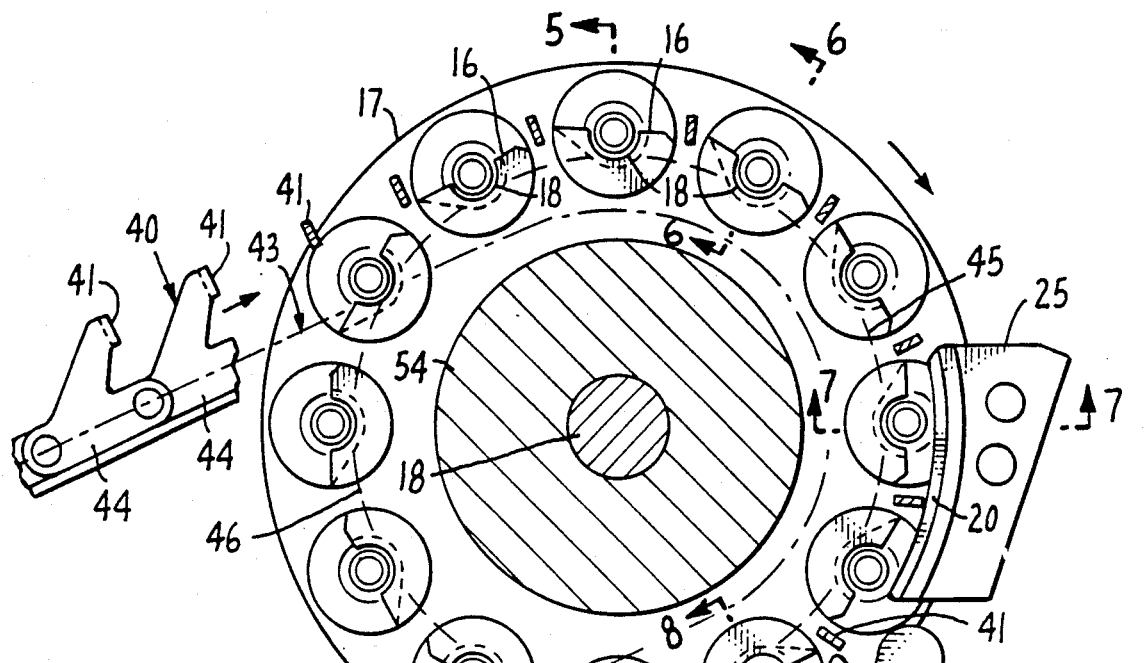
FIG. 3 is a cross-sectional view taken along line 3—3 of FIG. 1.

The overall arrangement of a preferred embodiment of the inventive apparatus will be described with reference to FIG. 1. Olives 10 positioned in cups 16 are translated along a circular path as plate 17 rotates. Each cup 16 is fixedly attached to plate 17, and locked into position by lock ring 45 (shown in FIG. 5). Drive shaft 18 is fixedly attached to plate 17 through the center of plate 17. Thus, when a drive means (not shown) rotates shaft 18 the cups are translated along a circular path in a plane perpendicular to the longitudinal axis of shaft 18. It is contemplated that the inventive apparatus may include any number of cups 16.

Each of plunger shafts 21 and 23 is fixedly attached to a pair of members 53 (shown in FIG. 5), which members are in turn fixedly attached to shaft 18. A coring knife 24 is attached to the end of each of shafts 23. A pitting knife 22 is attached to the end of each of shafts 21. Plate 17 and members 54 are oriented so that each cup 16 is positioned between one of knives 22 and one of knives 24, so that the longitudinal axis of each component in each combination of these components (knives 22 and 24 and the cup 16 therebetween) coincides with the longitudinal axes of the other components in the combination. As shaft 18 rotates, plate 17 and members 53 rotate as a unit with shaft 18 so that each cup 16, and the knives 22 and 24 spanning the cup, traverse parallel circular paths.

As shaft 18 rotates, and the members (such as members 53 and plate 17) fixedly attached to shaft 18 rotate as a unit with shaft 18, rigid frame members 14 and end plates 12 remain stationary. Cylinder 50 and cylinder 51 are fixedly attached to frame members 14, so that they remain stationary as shaft 18 rotates. Cam track 28 is defined in the side wall of cylinder 50. Cam track 34 is defined in the side wall of cylinder 51. As shaft 18 rotates, cam followers 30 ride in track 28 and cam followers 36 ride in track 24. A member 29 is connected between each cam follower and each of plunger shafts 21 and 23. Thus, when shaft 18 rotates, cam followers 30 and 36, members 29, and shafts 21 and 23 move parallel to the longitudinal axis of shaft 18.

Four slicing knives 60 are mounted on shaft 61. Shaft 61 is mounted on one of frame members 14. In a preferred embodiment, shaft 61 is rotatably mounted on frame member 14 and a drive means (to be described with reference to FIG. 3 below) is provided for rotating shaft 61 in the direction opposite to the direction in which shaft 18 rotates (so that for example, if shaft 18 rotates clockwise, shaft 61 rotates counterclockwise). For example, shaft 18 may be coupled by an appropriate coupling means (which may include a belt) to shaft 61, so that a drive means which powers shaft 18 also drives shaft 61. Alternatively, shaft 31 may be fixedly connected to frame member 14 and no drive means provided for shaft 61, so that knives 60 will remain stationary as shaft 18 and cups 16 rotate.

When a pitted olive in one of cups 16 rotates into engagement with knives 60, each knife 60 acts as a wedge to slice cleanly through the olive as shown in FIG. 2. In FIG. 2, four slicing knives 60 (shown by dashed lines) sever the olive engaged therewith into clean slices 10a through 10e. Each cup 16 preferably includes grooves 15, which are oriented parallel to the circular path traversed by the cup and parallel to the edges of parallel knives 60. Preferably, the separation between knives 60 matches the separation between grooves 15 so that knives 60 have enough clearance to pass completely through the olive while avoiding cup 16.

Although four slicing knives 60 are shown in FIGS. 1 and 2, it is contemplated that any number of slicing knives may be included in set of knives 60. Further, although each knife 60 in FIG. 1 is shown to have eight lobes (or blades), it is contemplated that each slicing knife may have circular shape or any other shape, provided that each slicing knife has a sharp outer edge.

Stripper element 31 has stripper bars 31a defining slots for receiving knives 60. Any olive slices clinging to knives 60 will be stripped from the knives as they translate past stripper bars 31a of element 31.

Because each olive is positioned in a definite orientation in one of cups 16 when it engages knives 60, the olive slices resulting from operation of knives 60 have uniform size and shape. After each olive is pitted, (in a manner to be described in more detail below with reference to FIGS. 6 and 7) it has a predictable position relative to the cup (determined by action of the pitting and coring knives, and the holding blades 20 to be discussed below), so that the knives 60 can be positioned in advanced so as to produce substantially equal sized end pieces (such as end pieces 10a and 10e of FIG. 2). Unlike conventional slicing machines which employ a sawing technique to produce each cut through an olive, each slicing knife of the inventive system acts simply as a wedge to produce a clean cut through the olive without destroying a significant amount of the olive to produce the cut.

Any conventional loading means may be employed for loading olives onto cups 16. Similarly, any conventional means may be employed for removing the end product (the pitted olive slices) from the apparatus after the slicing operation. Examples of such an end product removal means include an air or water jet (not shown) and stripper member 31.

FIG. 3 is a view taken along line 3—3 of FIG. 1 showing a cross-section of the FIG. 1 apparatus in a plane perpendicular to the longitudinal axis of shaft 18. Chain 40 comprises a plurality of links 44 (two of which are shown in FIG. 3) and extends around a sprocket (not shown) adjustably mounted on member 54 in front of plate 17 (in the FIG. 3 view). Accordingly, chain 40 is only partially shown, since if it were completely shown it would obscure plate 17 and various other elements in FIG. 3. As shaft 18 rotates clockwise, member 54 rotates plate 17 clockwise, and causes chain 40 to rotate clockwise around path 43. Locking ring 45 (to be discussed below with reference to FIG. 5) is positioned behind (and hence obscured by) plate 17, and has an outer cylindrical surface indicated by dashed line 46 in FIG. 3.

Sprocket 42 (also referred to herein as "star wheel drive 42") is mounted on shaft 61 behind slicing knife 60 (i.e., into the page relative to slicing knife 60) so that sprocket 42 is partially obscured by slicing knife 60. The relative size and shape of cups 16 and sprocket 42 are chosen so that the cups 16 (and more specifically, the base portions 11 of cups 16) fit between adjacent teeth 42a of sprocket 42. When shaft 18, member 54, and plate 17 rotate clockwise (as a unit), cups 16 rotate sprocket 42 (and shaft 61 and slicing knives 60 fixedly attached to shaft 61) in a counterclockwise direction. One of the functions of the cups 16 is thus to drive the sprocket 42. Since sprocket 42 and sprocket teeth 42a are fixed relative to slicing blades 60, sprocket 42 also serves a timing function, in the sense that as pairs of adjacent sprocket teeth 42a engage with each cup, such teeth 42a force the cup into a specific orientation relative to the blades of slicing knives 60. Thus, each slicing knife 60 will rotate through the same path relative to each cup as the knife slices an olive in the cup.

In an alternative embodiment, the end portion 41 of each link 44 extends sufficiently far toward sprocket 42 that the end portions 41 engage with sprocket teeth 42a.

Accordingly, when chain 40 rotates clockwise, chain 40 drives sprocket 42 (and shaft 61 and knives 60 fixedly attached to shaft 61) in a counterclockwise direction. In this alternative embodiment it is unnecessary for sprocket teeth 42a to engage with cups 16.

Mount 25 for holding blades 20 (not shown in FIG. 3) is attached by stationary member 26 (shown in FIG. 1)

to one of frame members 14 (shown in FIG. 1). Mount 25 is positioned relative to the path of cups 16 so that holding blades 20 engage the olive in each cup as the cup rotates past mount 25.

Figure 4:
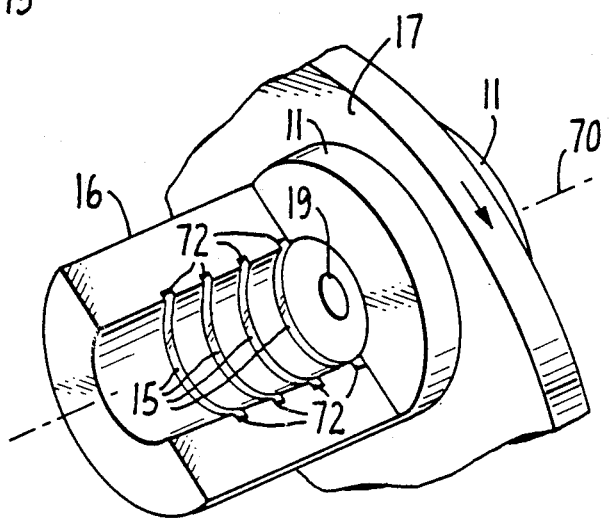
FIG. 4 is a perspective view of a grooved olive cup of the type included in a preferred embodiment of the invention.

FIG. 4 is a perspective view of a preferred embodiment of cup 16. Orifice 19 in base portion 11 of cup 16 attached to plate 17 is centered about longitudinal axis 70 of cup 16. Base portion 11 extends through plate 17, and is fixedly attached to plate 17. During the pitting operation, one of coring knives 24 extends through orifice 19 to core one end of an olive held in cup 16. Cup 16 in FIG. 4 includes four grooves 15, each for receiving the edge of a different slicing knife.

Figure 9:
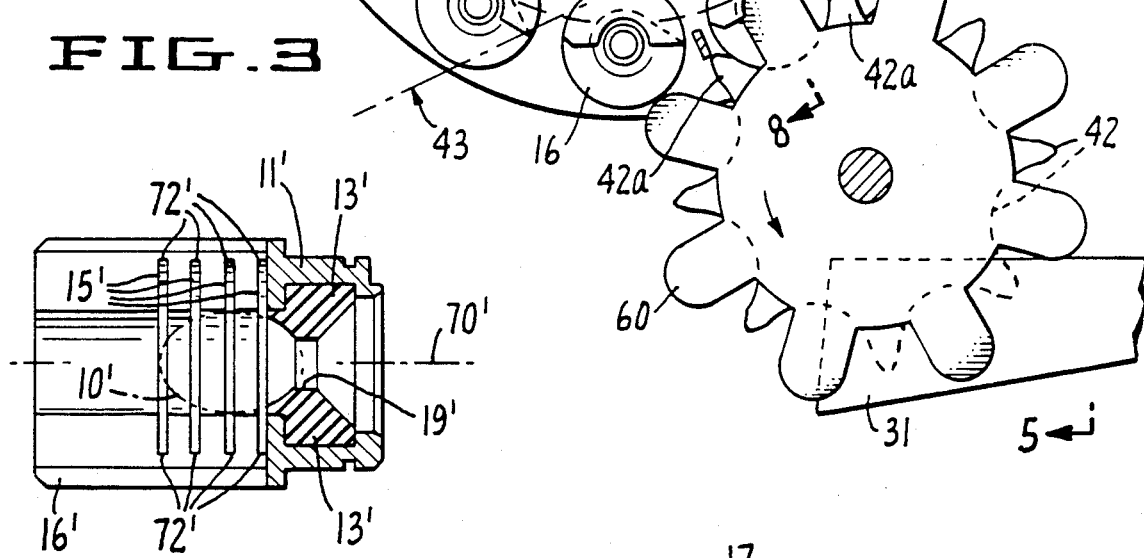
FIG. 9 is a cross-sectional view of another preferred embodiment of a grooved cup that may be included in a preferred embodiment of the inventive system, taken in a plane including the cup's longitudinal axis.

FIG. 9 is a cross-sectional view of a preferred embodiment of a grooved cup (identified by reference numeral 16') that may be used in place of cup 16 (shown in FIG. 4) in the inventive system. Cup 16' of FIG. 9 is sized and shaped to receive an olive, whose outline is identified by reference numeral 10'. The four grooves 15' in cup 16' are for receiving slicing knives, as are the four grooves 15 of cup 16. However, grooves 15' differ from grooves 15 in following respect. The ends 72' of each groove 15' extend closer to the outer edge of cup 16' than the ends 72 of each groove 15 extend toward the outer edge of cup 16. Since grooves 15 are longer than grooves 15', grooves 15' provide more clearance for the slicing knives than do grooves 15. Cup 16' also includes a resilient insert 13' within base portion 11'. Insert 13' is ring-shaped, and has a longitudinal axis which coincides with longitudinal axis of cup 16'. The inner cylindrical surface of insert 13' defines orifice 19', which orifice is oriented to receive one of coring knives 24. Insert 13'may be formed of rubber or another resilient material. An advantage of including resilient insert 13' is that insert 13' is capable of temporarily deforming to admit an unusually large olive pit, or an olive pit that is mis-oriented with its longitudinal axis perpendicular to axis 70' of cup 16'. In contrast, orifice 19 of cup 16 in FIG. 4 is defined by base portion 11. Base portion 11 will typically be composed of a rigid substance (such as rigid plastic), and if so may either fail to admit such an unusually large or mis-oriented pit, causing the inventive system to jam, or may break such a pit as the pit is pressed against base portion 11.

Figure 5:
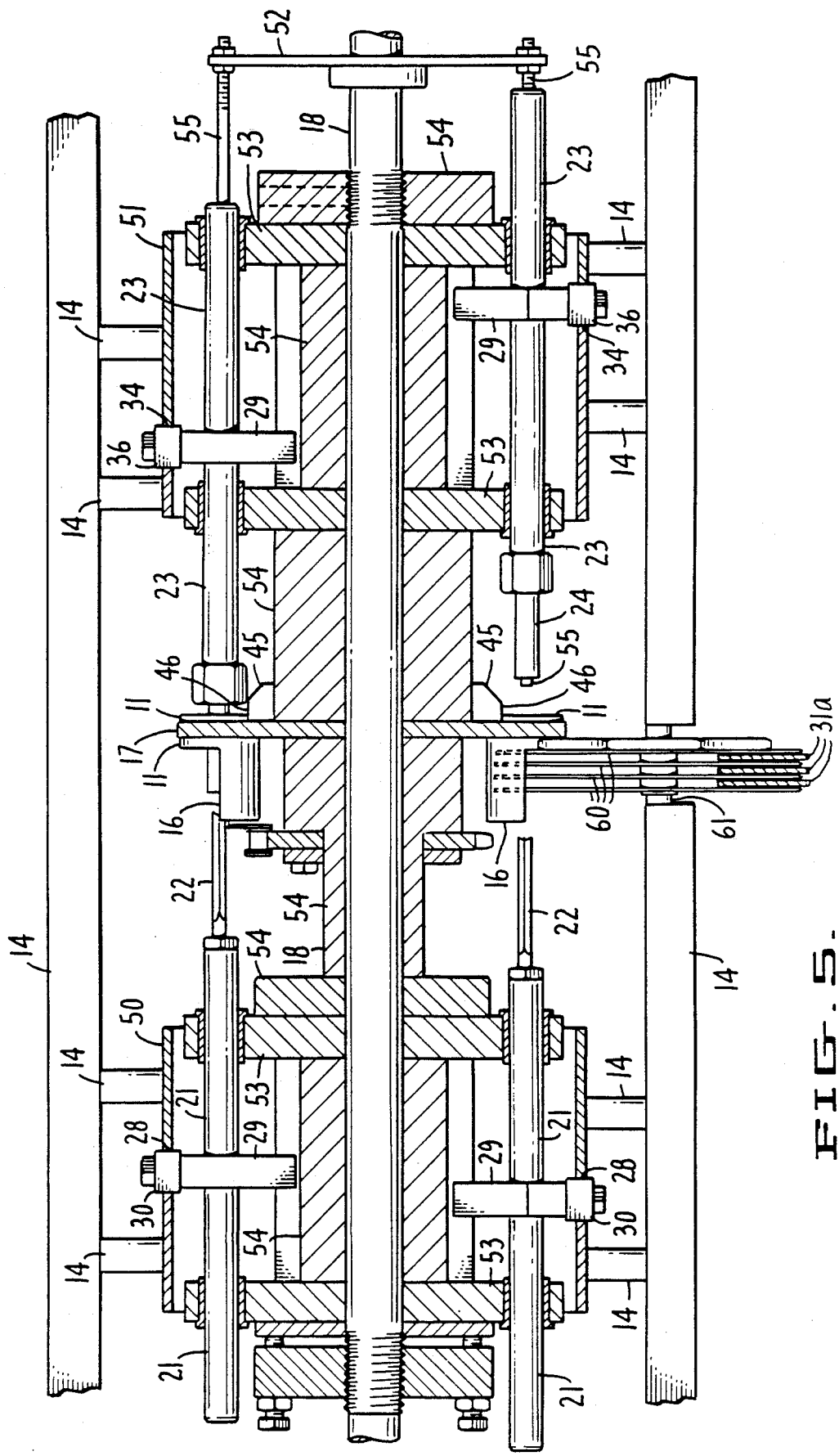
FIG. 5 is a cross-sectional view of the FIG. 1 apparatus, taken along line 5—5 of FIG. 3.

FIG. 5 is a cross-sectional view of the FIG. 1 apparatus, taken along line 5—5 of FIG. 3. The upper plunger shaft 23 in FIG. 5 has been driven by the associated cam follower 36 and member 29 connected thereto into a position fully extended to the left. The upper plunger shaft 21 in FIG. 5 has been driven by the associated cam follower 30 and member 29 connected thereto into a position fully extended to the right. Thus, if an olive would have been disposed in upper cup 16, the upper pitting knife 22 and the upper coring knife 24 (not shown in FIG. 5, since it is obscured by upper cup 16) would each have penetrated a different end of the olive. The lower plunger shaft 23 in FIG. 5 has been driven by the associated cam follower 36 and member 29 connected thereto into a position fully retracted to the right. The lower plunger shaft 21 in FIG. 5 has been driven by the associated cam follower 30 and member 29 connected thereto into a position retracted to the left. Thus, the lower pitting knife 22 and the lower coring knife 24 have been retracted to avoid hitting slicing blades 60 as lower knives 22 and 24 rotate past slicing knives 60.

Rotating member 53 in turn rotates shafts 23 through a cylindrical region surrounding shaft 18. As shafts 23 rotate, they also translate to the left and to the right as cam followers 36 ride in cam track 34. An identical support means (not shown in FIG. 5 for simplicity) rotates shafts 21 while allowing them to translate to the right and to the left as cam followers 30 ride in cam track 28.

Each of ejector rods 55 is slidably positioned inside of one of plungers 23 and is rigidly attached to member 52. As shaft 18 rotates, it causes member 52 to rotate relative to stationary frame members 14. The relative movement between plungers 23 and ejector rods 55 causes removal of pit 11a and olive end piece 12a from the coring knife 24 as each plunger 23 is retracted.

As shaft 18 is rotated by a conventional drive means (not shown), plate 17, locking ring 45, and members 52, 53, and 54 rotate as a unit with shaft 18. However, frame members 14 and cylindrical members 50 and 51 (and end plates 12 shown in FIG. 1), remain stationary.

Locking ring 45 is fitted around the outer surface of cylindrical member 54 to prevent cups 16 from rotating relative to plate 17. Base portion 11 of each cup 16 preferably includes an arc-shaped notch having radius of curvature matching the outer radius of ring 45, so that the arc-shaped notch mates with outer cylindrical surface 46 of ring 45. Friction between ring 45, plate 17, and member 54 prevents relative motion therebetween. Since each base portion 11 mates with ring 45, ring 45 holds base portions 11 fixed relative to each other and to ring 45, so that each base portion 11 is held fixed relative to plate 17.

Figure 6:
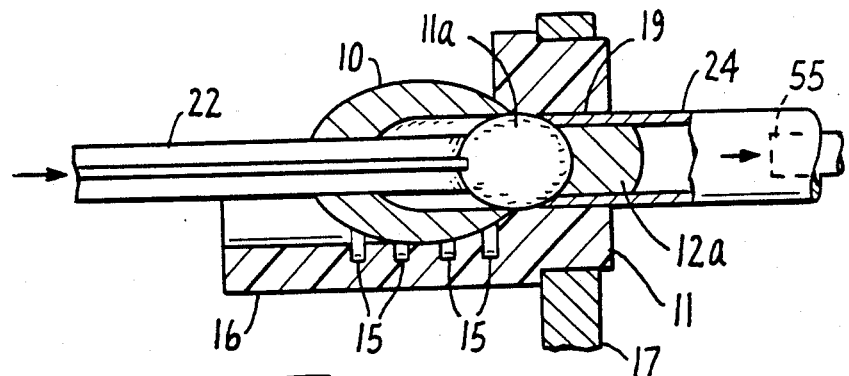
FIG. 6 is a cross-sectional view of a portion of the FIG. 1 apparatus, taken along line 6—6 of FIG. 3.
Figure 7:
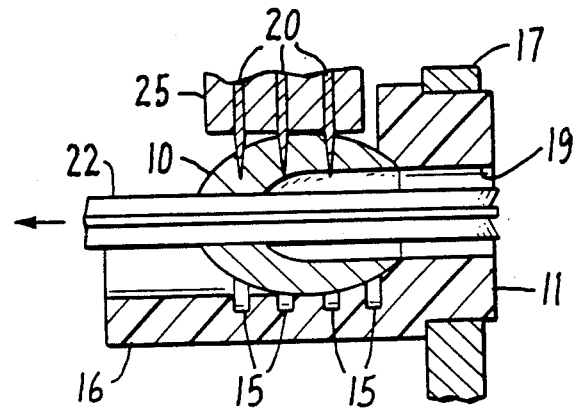
FIG. 7 is a cross-sectional view of a portion of the FIG. 1 apparatus, taken along line 7—7 of FIG. 3.

The pitting operation will be described in more detail with reference to FIGS. 6 and 7. FIGS. 6 and 7 illustrate cup 16 at two positions within a segment of its circular path during which pitting knife 22 and coring knife 24 are translated by the cam means associated therewith into engagement with an olive in the cup, and during which knives 22 and 24 are then retracted from the olive by the cam means.

In FIG. 6, pitting knife 22 (which preferably has a cross-shaped cross-section) has penetrated the left end of olive 10 and coring knife 24 (which could be tubular or cross-shaped) has penetrated the right end of olive 10. At the stage of the pitting operation represented by FIG. 6, coring knife 24 has begun to retract to the right. Simultaneously, pitting knife 22 continues to extend to the right, thus pushing pit 11a and end piece 12a of olive 10 to the right, away from the remaining portion of olive 10. End piece 12a would not be present if coring knife 24 is cross-shaped rather than tubular.

At the stage of the pitting operation represented by FIG. 7, coring knife 24 has retracted to the right, pitting knife 22 has pushed pit 11a and end piece 12a away from the pitted olive remaining in cup 16, and pitting knife 22 has begun to retract to the left. Cup 16 has rotated to a position adjacent holding blades 25 so that pitted olive 10 is engaged with holding blades 20 (which are mounted in mount 25). Thus, each of holding blades 20 exerts a force on olive 10 resisting the force exerted by knife 22 on olive 10 as knife 22 retracts to the left. In this way, the olive is maintained in a predictable position in cup 16 for the subsequent slicing operation. It is preferred that each holding blade 20 be positioned opposite one of grooves 15 in cup 16, and that each slicing knife 60 (shown in FIG. 8) also be positioned opposite one of the grooves 15. If so, then the earlier slices made by blades 20 will coincide with the later slices made by knives 60, resulting in an improved appearance for the end product (olive slices) produced by the inventive apparatus. It is contemplated that any number of holding blades 20 may be provided.

In an alternative embodiment, holding blades 20 may be omitted, and cam track 28 shaped so that knives 60 engage the pitted olive while pitting knife 22 has not yet retracted from the olive (i.e., while pitting knife 22 is in the position shown in FIG. 7). Of course, in such an alternative embodiment, cam track 28 must be shaped so as to retract knife 22 sufficiently rapidly so that knife 22 avoids knives 60.

Figure 8:
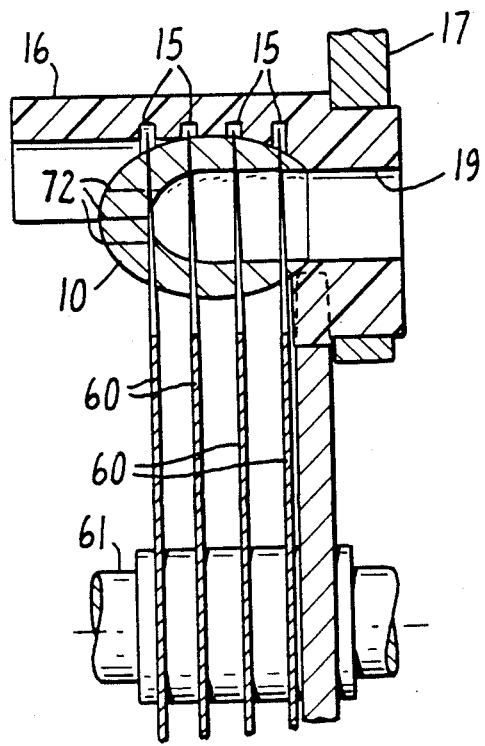
FIG. 8 is a cross-sectional view of a portion of the FIG. 1 apparatus, taken along line 8—8 of FIG. 3.

FIG. 8 illustrates cup 16 when the cup occupies a segment of its circular path in which the pitting operation has been completed and pitting and coring knives have retracted. FIG. 8 shows wounds 72 in the end of pitted olive 10 that were produced upon retraction of pitting knife 22 from pitted olive 10. In FIG. 8, knives 60 have sliced all the way through pitted olive 10. The edge of each knife 60 extends into a corresponding one of grooves 15 in cup 16.

Thus, as shown in FIG. 8, knives 60 have produced four clean cuts, which have divided pitted olive 10 into five slices. After the processing stage shown in FIG. 8, knives 60 and cup 16 will rotate away from each other so that these five slices may then be stripped from knives 60, for example by stripper 31 shown in FIGS. 1 and 3.

The method of the invention includes the steps of: translating a cup containing an olive to be processed along a portion of a substantially circular cup path; translating a pitting unit along a path substantially parallel to the cup path; while the cup occupies a first segment of the cup path, extending a pitting knife and a coring knife included in the pitting unit into engagement with the olive to extract a pit from the olive, and retracting the pitting and coring knives away from the olive and cup after the pit is extracted; and while the pitted olive remains in the cup with unchanged orientation relative to the cup, translating the cup past a set of slicing knives in such a manner that the slicing knives engage with and slice the pitted olive in the cup. Since the olive's orientation relative to the cup is unchanged between the pitting and slicing operations (so that, for example, the ends of the pitted olive have a predictable position relative to the center of the cup), the slicing knives may be accurately pre-positioned to produce pitted olive slices having uniform size and shape. The slicing knives may be stationary or they may be rotating when they engage the pitted olive. In a preferred embodiment, the olive is translated past and engages with one or more holding blades (such as blades 20) during the pitting operation. Each holding blade is positioned relative to the cup path so that, when the olive is engaged with the holding blade, the olive is impaled on the pitting knife and the pitting knife is retracting away from the olive in a first direction perpendicular to the cup path, and the holding blade exerts a force on the olive in a second direction opposite the first direction. Thus, the holding blade holds the pitted olive fixed with respect to the cup while the pitting knife retracts away from the pitted olive. Alternatively, the slicing knives may be positioned so as to engage with the pitted olive while the olive is impaled on the pitting knife and the pitting knife is retracting away from the olive in a first direction perpendicular to the cup path. In this variation, the slicing knives exerts a force on the olive in a second direction opposite the first direction, so as to hold the pitted olive fixed with respect to the cup while the pitting knife retracts away from the pitted olive.

However, in this variation, the slicing knives must be positioned so as to avoid penetrating so deeply into the olive (while the olive remains impaled on the pitting knife) that the slicing knives strike the pitting knife. The slicing knives instead commence their cuts while the olive is impaled on the pitting knife, and complete their cuts after the pitting knife has retracted away from the pitted olive.

The foregoing is merely illustrative and explanatory of the inventive method and apparatus. Various changes in the component sizes and shapes, and other details of the embodiments described herein may be within the scope of the appended claims.

What is claimed is:

1. An olive pitting and slicing apparatus, including:
   a rotatable drive shaft;
   a plate fixedly attached to the drive shaft;
   a first cup dimensioned to receive an olive, and fixedly mounted on the plate so that rotation of the drive shaft will cause the plate to translate the first cup, and any olive within the first cup, along a substantially circular cup path;
   a first pitting means capable of extending toward the first cup when the first cup occupies a first segment of the cup path to extract an olive pit from an olive in the first cup, wherein the first pitting means is also capable of retracting away from the first cup after extraction of the olive pit; and
   a set of slicing knives non-translatably mounted adjacent a second segment of the cup path, in such a position that the slicing knives engage with and slice a pitted olive in the first cup when the first cup occupies the second segment of the cup path, wherein the drive shaft is capable of rotating in a first rotational direction so as to translate the first cup along the cup path in said first rotational direction, and also including:
   a frame;
   a slicing knife shaft rotatably mounted on the frame and fixedly attached to the slicing knives so that rotation of the slicing knife shaft will rotate each slicing knife; and
   a slicing knife rotation means coupled to the slicing knife shaft, for rotating the slicing knife shaft and the slicing knives as a unit in a second rotational direction opposite the first rotational direction as the first cup translates through the second segment of the cup path.

2. The apparatus of claim 1, wherein the slicing knife rotation means includes:
   a sprocket fixedly attached to the slicing knife shaft and having sprocket teeth, wherein the sprocket teeth are positioned so as to engage with the first cup as the first cup translates along said cup path in said first rotational direction, so that the first cup will drive the sprocket in said second rotational direction as the first cup translates along said cup path in said first rotational direction.

3. The apparatus of claim 1, wherein the slicing knife rotation means includes:
   a sprocket fixedly attached to the slicing knife shaft;
   a chain coupled between the drive shaft and the sprocket in such a manner that rotation of the drive shaft in the first rotational direction will translate the chain along a chain path in said first rotational direction, and the chain will rotate the sprocket in said second rotational direction as the chain rotates along said chain path in said first rotational direction.

4. An olive pitting and slicing apparatus, including:
a rotatable drive shaft;
a plate fixedly attached to the drive shaft;
a first cup dimensioned to receive an olive, and fixedly mounted on the plate so that rotation of the drive shaft will cause the plate to translate the first cup, and any olive within the first cup, along a substantially circular cup path;
a first pitting means capable of extending toward the first cup when the first cup occupies a first segment of the cup path to extract an olive pit from an olive in the first cup, wherein the first pitting means is also capable of retracting away from the first cup after extraction of the olive pit; and
a set of slicing knives non-translatably mounted adjacent a second segment of the cup path, in such a position that the slicing knives engage with and slice a pitted olive in the first cup when the first cup occupies the second segment of the cup path, wherein the first cup has a surface defining a number of grooves, and wherein each slicing knife is aligned with one of the grooves, so that when the slicing knives have sliced a pitted olive in the first cup, each of the slicing knives extend into the groove aligned therewith.

5. The apparatus of claim 4, wherein each slicing knife includes a number of lobes, and when the slicing knives have sliced a pitted olive in the first cup, each slicing knife has a lobe extending into the groove aligned with said each slicing knife.

6. The apparatus of claim 4, wherein each slicing knife is circularly shaped.

7. An olive pitting and slicing apparatus, including:
a rotatable drive shaft;
a plate fixedly attached to the drive shaft;
a first cup dimensioned to receive an olive, and fixedly mounted on the plate so that rotation of the drive shaft will cause the plate to translate the first cup, and any olive within the first cup, along a substantially circular cup path;
a first pitting means capable of extending toward the first cup when the first cup occupies a first segment of the cup path to extract an olive pit from an olive in the first cup, wherein the first pitting means is also capable of retracting away from the first cup after extraction of the olive pit, and wherein the first pitting means includes: a first cylindrical member defining a first cam track; a first pitting knife attached to the drive shaft in a manner so that rotation of the drive shaft will cause the first pitting knife to translate along a pitting knife path substantially parallel to the cup path; a first cam follower riding in the first cam track and coupled to the first pitting knife so as first to push the first pitting knife into engagement with an olive in the first cup, and then to pull the first pitting knife out of engagement with the olive, while the first cup occupies the first segment of the cup path and while the first pitting knife occupies a first segment of the pitting knife path; a second cylindrical member defining a second cam track; a first coring knife attached to the drive shaft in a manner so that rotation of the drive shaft will cause the first coring knife to translate along a coring knife path substantially parallel to the cup path; and a second cam follower riding in the second cam track and coupled to the first coring knife so as to push the first coring knife into engagement with an olive in the first cup while the first cup occupies the first segment of the cup path and while the first coring knife occupies a first segment of the coring knife path; and
a set of slicing knives non-translatably mounted adjacent a second segment of the cup path, in such a position that the slicing knives engage with and slice a pitted olive in the first cup when the first cup occupies the second segment of the cup path; and
a first holding blade mounted in such a position adjacent the first segment of the cup path that the first holding blade engages with an olive in the first cup when the first cup occupies the first segment of the cup path and the first pitting knife is engaged with the olive but is being pulled out of engagement with the olive, and when the first holding blade is engaged with the olive the first holding blade exerts a resisting force on the olive opposing the force exerted on the olive by the first pitting knife as the first pitting knife is pulled out of engagement with the olive.

8. The apparatus of claim 7, also including a second holding blade mounted in such a position adjacent the first segment of the cup path that the second holding blade engages with an olive in the first cup when the first cup occupies the first segment of the cup path and the first pitting knife is engaged with the olive but is being pulled out of engagement with the olive, and when the second holding blade is engaged with the olive the second holding blade exerts a resisting force on the olive opposing the force exerted on the olive by the first pitting knife as the first pitting knife is pulled out of engagement with the olive, and wherein each of the first and second holding blades is aligned with one of the slicing knives, so that any cuts made in the olive by the first and second holding blades will align with the cuts later made in the olive by the slicing knives.

9. An olive pitting and slicing apparatus, including:
a rotatable drive shaft;
a plate fixedly attached to the drive shaft;
a first cup dimensioned to receive an olive, and fixedly mounted on the plate so that rotation of the drive shaft will cause the plate to translate the first cup, and any olive within the first cup, along a substantially circular cup path;
a first pitting means capable of extending toward the first cup when the first cup occupies a first segment of the cup path to extract an olive pit from an olive in the first cup, wherein the first pitting means is also capable of retracting away from the first cup after extraction of the olive pit, wherein the first pitting means includes: a first cylindrical member defining a first cam track; a first pitting knife attached to the drive shaft in a manner so that rotation of the drive shaft will cause the first pitting knife to translate along a pitting knife path substantially parallel to the cup path; a first cam follower riding in the first cam track and coupled to the first pitting knife so as first to push the first pitting knife into engagement with an olive in the first cup, and then to pull the first pitting knife out of engagement with the olive, while the first cup occupies the first segment of the cup path and while the first pitting knife occupies a first segment of the pitting knife path; a second cylindrical member defining a second cam track; a first coring knife attached to the drive shaft in a manner so that rotation of the drive shaft will cause the first coring knife to translate along a coring knife path substantially parallel to the cup path; and a second cam follower riding in the second cam track and coupled to the first coring knife so as to push the first coring knife into engagement with an olive in the first cup while the first cup occupies the first segment of the cup path and while the first coring knife occupies a first segment of the coring knife path; and a set of slicing knives non-translatably mounted adjacent a second segment of the cup path, in such a position that the slicing knives engage with and slice a pitted olive in the first cup when the first cup occupies the second segment of the cup path; wherein the slicing knives are mounted adjacent the first segment of the cup path and adjacent the second segment of the cup path, in such a position that the slicing knives begin to engage with a pitted olive in the first cup when the first cup occupies the first segment of the cup path and the first pitting knife is engaged with the olive and the slicing knives continue to engage with the pitted olive in the first cup when the first cup occupies the second segment of the cup path.

10. An olive pitting and slicing apparatus, including:
a rotatable drive shaft;
a plate fixedly attached to the drive shaft;
a plurality of cups, each dimensioned to receive an olive, each said cup being fixedly mounted near an outer periphery of the plate so that rotation of the drive shaft will cause the plate to translate the cups, and any olives within the cups, along a substantially circular cup path;
a plurality of pitting units, where each said pitting unit is mounted on the drive shaft in a position adjacent one of the cups so that rotation of the drive shaft will cause each pitting unit to translate as a unit with the cup adjacent thereto, where each said pitting unit is capable of extending toward the cup adjacent thereto when the cup occupies a first segment of the cup path in order to extract an olive pit from an olive in the cup, and where each said pitting unit is also capable of retracting away from the cup adjacent thereto after extraction of the olive pit; and
a set of slicing knives non-translatably mounted adjacent a second segment of the cup path, in such a position that the slicing knives engage with and slice a pitted olive in each cup as each said cup traverses the second segment of the cup path, wherein the drive shaft is capable of rotating in a first rotational direction so as to translate the cups along the cup path in said first rotational direction, and also including:
a frame;
a slicing knife shaft rotatably mounted on the frame and fixedly attached to the slicing knives so that rotation of the slicing knife shaft will rotate each slicing knife; and
a slicing knife rotation means coupled to the slicing knife shaft, for rotating the slicing knife shaft and the slicing knives as a unit in a second rotational direction opposite the first rotational direction while the cups translate along the cup path.

11. The apparatus of claim 10, wherein the slicing knife rotation means includes:
a sprocket fixedly attached to the slicing knife shaft;
a chain coupled between the drive shaft and the sprocket so that rotation of the drive shaft in the first rotational direction will translate the chain along a chain path in said first rotational direction, and so that the chain will rotate the sprocket in said second rotational direction as the chain rotates along said chain path in said first rotational direction.

12. An olive pitting and slicing apparatus, including:
a rotatable drive shaft;
a plate fixedly attached to the drive shaft;
a plurality of cups, each dimensioned to receive an olive, each said cup being fixedly mounted near an outer periphery of the plate so that rotation of the drive shaft will cause the plate to translate the cups, and any olives within the cups, along a substantially circular cup path;
a plurality of pitting units, where each said pitting unit is mounted on the drive shaft in a position adjacent one of the cups so that rotation of the drive shaft will cause each pitting unit to translate as a unit with the cup adjacent thereto, where each said pitting unit is capable of extending toward the cup adjacent thereto when the cup occupies a first segment of the cup path in order to extract an olive pit from an olive in the cup, and where each said pitting unit is also capable of retracting away from the cup adjacent thereto after extraction of the olive pit; and
a set of slicing knives non-translatably mounted adjacent a second segment of the cup path, in such a position that the slicing knives engage with and slice a pitted olive in each cup as each said cup traverses the second segment of the cup path, wherein each cup has a surface defining a number of grooves, and wherein each slicing knive is aligned with one of the grooves, so that when the slicing knives have sliced a pitted olive in one of the cups, each of the slicing knives extends into the groove aligned therewith.

13. The apparatus of claim 12, wherein each slicing knife includes a number of lobes, and when the slicing knives have sliced a pitted olive in one of the cups, each slicing knife has a lobe extending into the groove aligned with said each slicing knive.

14. The apparatus of claim 12, wherein each slicing knife is circularly shaped.

15. An olive pitting and slicing apparatus, including:
a rotatable drive shaft;
a plate fixedly attached to the drive shaft;
a plurality of cups, each dimensioned to receive an olive, each said cup being fixedly mounted near an outer periphery of the plate so that rotation of the drive shaft will cause the plate to translate the cups, and any olives within the cups, along a substantially circular cup path;
a plurality of pitting units, where each said pitting unit is mounted on the drive shaft in a position adjacent one of the cups so that rotation of the drive shaft will cause each pitting unit to translate as a unit with the cup adjacent thereto, where each said pitting unit is capable of extending toward the cup adjacent thereto when the cup occupies a first segment of the cup path in order to extract an olive pit from an olive in the cup, where each said pitting unit is also capable of retracting away from the cup adjacent thereto after extraction of the olive pit, and wherein each pitting unit includes: a first cylindrical member defining a first cam track; a pitting knife attached to the drive shaft in a manner so that rotation of the drive shaft will cause the pitting knife to translate along a pitting knife path substantially parallel to the cup path; a first cam follower riding in the first cam track and coupled to the pitting knife so as first to push the pitting knife into engagement with an olive in the cup adjacent the pitting unit, and then to pull the pitting knife out of engagement with the olive, while the cup occupies the first segment of the cup path and while the pitting knife occupies a first segment of the pitting knife path; a second cylindrical member defining a second cam track; a coring knife attached to the drive shaft in a manner so that rotation of the drive shaft will cause the coring knife to translate along a coring knife path substantially parallel to the cup path; and a second cam follower riding in the second cam track and coupled to the coring knife so as to push the coring knife into engagement with an olive in the cup adjacent the pitting unit while the cup occupies the first segment of the cup path and while the coring knife occupies a first segment of the coring knife path;

a set of slicing knives non-translatably mounted adjacent a second segment of the cup path, in such a position that the slicing knives engage with and slice a pitted olive in each cup as each said cup traverses the second segment of the cup path; and a first holding blade mounted in such a position adjacent the first segment of the cup path that the first holding blade engages with each olive in each cup translating through the first segment of the cup path while the pitting knife is engaged with said each olive but is being pulled out of engagement with the olive, wherein the first holding blade exerts a resisting force on the olive when the first holding blade is engaged with the olive, said resisting force opposing the force exerted on the olive by the pitting knife as the pitting knife is pulled out of engagement with the olive.

16. A method for pitting and slicing an olive, including the steps of:
   (a) translating a cup containing an olive along a portion of a substantially circular cup path;
   (b) translating a pitting unit, including a pitting knive and a coring knife, along a path substantially parallel to the cup path;
   (c) while the cup occupies a first segment of the cup path, extending the pitting knife and the coring knife from the pitting unit into engagement with the olive in the cup to extract a pit from the olive;
   (d) retracting the pitting and coring knives away from the cup after the pit is extracted; and
   (e) while the pitted olive remains in the cup with unchanged orientation relative to the cup, translating the cup past a set of non-translating slicing knives in such a manner that the slicing knives engage with and slice the pitted olive in the cup.

17. The method of claim 16, also including the step of:
   (f) while the olive is impaled on the pitting knife and the pitting knife is retracting away from the olive impaled thereon in a first direction perpendicular to the cup path, translating the cup past a holding blade, said holding blade being positioned so that the holding blade engages with the olive and exerts a force on the olive in a second direction opposite the first direction.

18. The method of claim 17, wherein the holding blade holds the pitted olive fixed with respect to the cup while the pitting knife retracts away from the pitted olive.

19. The method of claim 16, wherein the slicing knives are positioned so as to engage with the pitted olive while the pitted olive is impaled on the pitting knife and the pitting knife is retracting away from the pitted olive impaled thereon in a first direction perpendicular to the cup path.

20. The method of claim 19, wherein the slicing knives exerts a force on the olive in a second direction opposite the first direction, so as to hold the pitted olive fixed with respect to the cup while the pitting knife retracts away from the pitted olive.

* * * * *